(12) United States Patent
Lohr (10) Patent No.: US 7,090,600 B2
(45) Date of Patent: Aug. 15, 2006

(54) DRIVER PULLEY SYSTEM FOR USE IN TORQUE CONVERTER

(75) Inventor: Thomas H. Lohr, Beaver Dam, WI (US)

(73) Assignee: Hoffco/Comet Industries, Inc., Richmond, IN (US)

( * ) Notice: Subject to any disclaimer, the term of this patent is extended or adjusted under 35 U.S.C. 154(b) by 353 days.

(21) Appl. No.: 10/693,431

(22) Filed: Oct. 24, 2003

(65) Prior Publication Data

US 2005/0090341 A1 Apr. 28, 2005

(51) Int. Cl.
*F16H 59/00* (2006.01)
(52) U.S. Cl. .................................................... 474/14
(58) Field of Classification Search .............. 474/8, 474/11, 13, 14, 24
See application file for complete search history.

(56) References Cited

U.S. PATENT DOCUMENTS

| 2,155,351 | A | | 4/1939 | Paulus |
| 2,612,054 | A | | 9/1952 | Davis |
| 2,928,286 | A | | 3/1960 | Davis |
| 2,987,934 | A | | 6/1961 | Thomas |
| 3,545,580 | A | | 12/1970 | Baer |
| 3,625,079 | A | | 12/1971 | Hoff |
| 3,747,721 | A | | 7/1973 | Hoff |
| 3,824,867 | A | | 7/1974 | Brooks |
| 3,850,050 | A | | 11/1974 | Lemmens |
| 4,179,946 | A | | 12/1979 | Kanstoroom |
| 4,196,641 | A | | 4/1980 | Vogel |
| 4,364,735 | A | * | 12/1982 | Plamper et al. ............... 474/14 |
| 4,380,444 | A | | 4/1983 | Dolza |
| 4,575,363 | A | * | 3/1986 | Burgess et al. ............... 474/14 |
| 4,826,467 | A | * | 5/1989 | Reese et al. .................. 474/14 |
| 4,969,856 | A | | 11/1990 | Miyata et al. |
| 5,209,703 | A | * | 5/1993 | Mastine et al. ............... 474/14 |
| 5,458,539 | A | | 10/1995 | Landry |
| 5,460,575 | A | | 10/1995 | Berto |
| RE35,617 | E | | 9/1997 | Krivec |
| 5,797,816 | A | | 8/1998 | Bostelmann |
| 6,149,540 | A | | 11/2000 | Johnson et al. |
| 6,155,940 | A | | 12/2000 | Templeton |
| 6,186,915 | B1 | | 2/2001 | Dietl |
| 6,248,035 | B1 | | 6/2001 | Bartlett |
| 6,336,878 | B1 | | 1/2002 | Ehrlich et al. |
| 6,336,879 | B1 | | 1/2002 | Schmid et al. |
| 6,343,024 | B1 | | 1/2002 | Walter et al. |
| 6,406,390 | B1 | | 6/2002 | Roby |
| 6,958,025 | B1 | * | 10/2005 | Huddleston .................. 474/19 |
| 2001/0044350 | A1 | | 11/2001 | Nishigaya et al. |
| 2001/0049312 | A1 | | 12/2001 | Warner et al. |
| 2002/0019280 | A1 | | 2/2002 | Brown |
| 2002/0032088 | A1 | | 3/2002 | Korenjak et al. |

(Continued)

OTHER PUBLICATIONS

Three Photo images of torque converter (1 page)(Sep. 9, 2003).

(Continued)

*Primary Examiner*—Vicky A. Johnson
(74) *Attorney, Agent, or Firm*—Barnes & Thornburg LLP (57) ABSTRACT

A driver pulley system for use in a torque converter comprises a torque transmission device. The torque transmission device is used to transmit torque between components of the driver pulley system.

21 Claims, 6 Drawing Sheets

U.S. PATENT DOCUMENTS

| | | |
|---|---|---|
| 2002/0034995 A1 | 3/2002 | Borghi |
| 2002/0042313 A1 | 4/2002 | Aitcin |
| 2002/0058559 A1 | 5/2002 | Serkh |
| 2002/0119846 A1 | 8/2002 | Kitai et al. |
| 2002/0142870 A1 | 10/2002 | Okano et al. |
| 2002/0155909 A1 | 10/2002 | Roby |
| 2002/0160867 A1 | 10/2002 | Katou |
| 2002/0169041 A1 | 11/2002 | Onogi |
| 2003/0054909 A1 | 3/2003 | Flaspeter |

OTHER PUBLICATIONS

COMET® Industries literature on Salsbury Automatic Torque Converters (4 pages)(Sep. 9, 2003).

Drawings of model 30C driven pulley system (1 page)(May 12, 1998).

Drawings of model 40C driven pulley system (1 page)(May 2, 2000).

* cited by examiner

DRIVER PULLEY SYSTEM FOR USE IN TORQUE CONVERTER

BACKGROUND

The present disclosure relates to torque converters. More particularly, the present disclosure relates to driver pulley systems for use in torque converters.

Torque converters are used on vehicles as a type of transmission between an engine of the vehicle and a wheel (or other ground-engaging element) of the vehicle. A torque converter is variable in that it can upshift and downshift in response to engine speed (i.e., engine rpm) and torque (i.e., rotational resistance) encountered by the wheel. Such torque occurs, for example, when the vehicle travels up a hill.

A torque converter typically includes a belt trained about a driver pulley system and a driven pulley system. The driver and driven pulley systems are adjustable in response to engine speed and torque to vary the drive ratio of the torque converter.

SUMMARY

According to the present disclosure, a driver pulley system is disclosed for use in a torque converter. The driver pulley system includes a torque transmission device configured to transmit torque between components of the driver pulley system through a path not including a centrifugal weight unit included in the driver pulley system to limit loading on the centrifugal weight unit.

The driver pulley system includes a fixed unit and a movable unit. The fixed unit is adapted to be fixed to a rotatable output of an engine to rotate with the engine output. The movable unit is configured to move relative to the fixed unit to facilitate shifting of the torque converter. A fixed flange included in the fixed unit and a movable flange included in the movable unit cooperate to receive a belt included in the torque converter. The centrifugal weight unit is responsive to centrifugal force to move the movable flange toward the fixed flange to upshift the torque converter upon increased engine speed.

The torque transmission device is included in the movable unit and is configured to transmit torque from the movable flange to a cover that is included in the fixed unit and axially covers the centrifugal weight unit. The torque transmission device includes a movable sleeve, a slider mount, and a slider. The movable sleeve is coupled to the movable flange for axial movement with the movable flange. The slider mount is coupled to an outer surface of the movable sleeve. The slider is coupled to the slider mount for axial, slidable movement against a drive plate included in the cover to transmit torque to the drive plate upon downshifting of the engine.

Additional features of the present disclosure will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION

Figure 1:
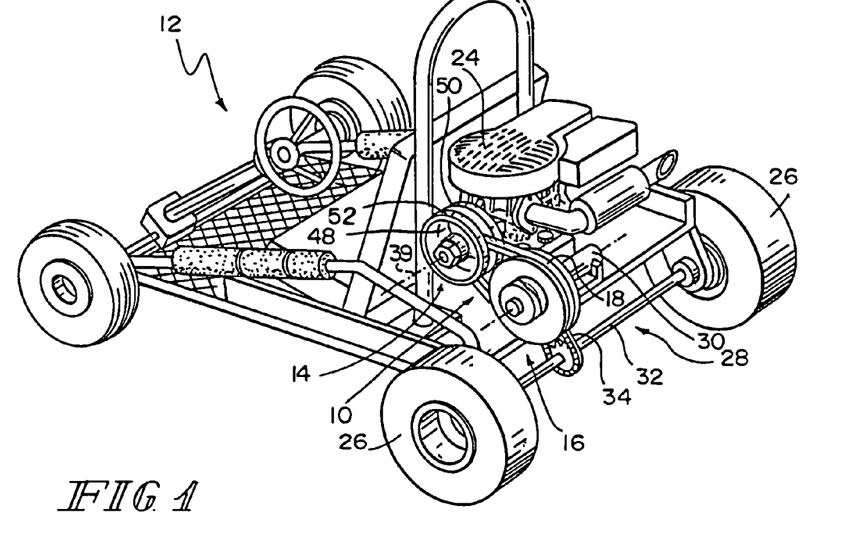
FIG. 1 is a perspective view of a vehicle (e.g., a go-kart) showing the vehicle including a torque converter that is continuously variable in response to vehicle engine speed and torque (i.e., rotational resistance) experienced by one or both of the vehicle rear wheels and showing the torque converter including a belt trained about a driver pulley system coupled to the vehicle engine and a driven pulley system coupled to one or both of the rear wheels.

A torque converter 10 for use in a vehicle 12 is shown, for example, in FIG. 1. Torque converter 10 includes a driver pulley system 14, a driven pulley system 16, and a belt 18 trained about driver and driven pulley systems 14, 16. Driver pulley system 14 includes a centrifugal weight unit 20 and a torque transmission device 22 configured to transmit torque between components of driver pulley system 14 through a path not including centrifugal weight unit 20 to limit loading thereon, as suggested diagrammatically in FIG. 2.

Torque converter 10 is continuously variable in response to speed of an engine 24 of vehicle 12 and torque experienced by a ground-engaging device 26 of vehicle 12. Driver and driven pulley systems 14, 16 are adjustable in response to engine speed and torque to vary the "drive ratio" of torque converter 10.

In the illustrated embodiment, vehicle 10 is a go-kart and ground-engaging device 26 is one or both of the rear wheels of the go-kart, as shown, for example, in FIG. 1. A connector 28 is used to interconnect driven pulley system 16 and device 26. Connector 28 includes a jackshaft 30 coupled to driven pulley system 16, a rear axle 32 coupled to device 26, and a chain-and-sprocket unit 34 coupled to jackshaft 30 and rear axle 32. In some embodiments, a differential (not shown) is included in connector 28. It is within the scope of this disclosure for vehicle 10 to be other types of vehicles such as all-terrain vehicles, motorcycles, mini-bikes, and snowmobiles, and the like, and for ground-engaging element 26 and connector 28 to be suitable for such a vehicle.

Figure 2:
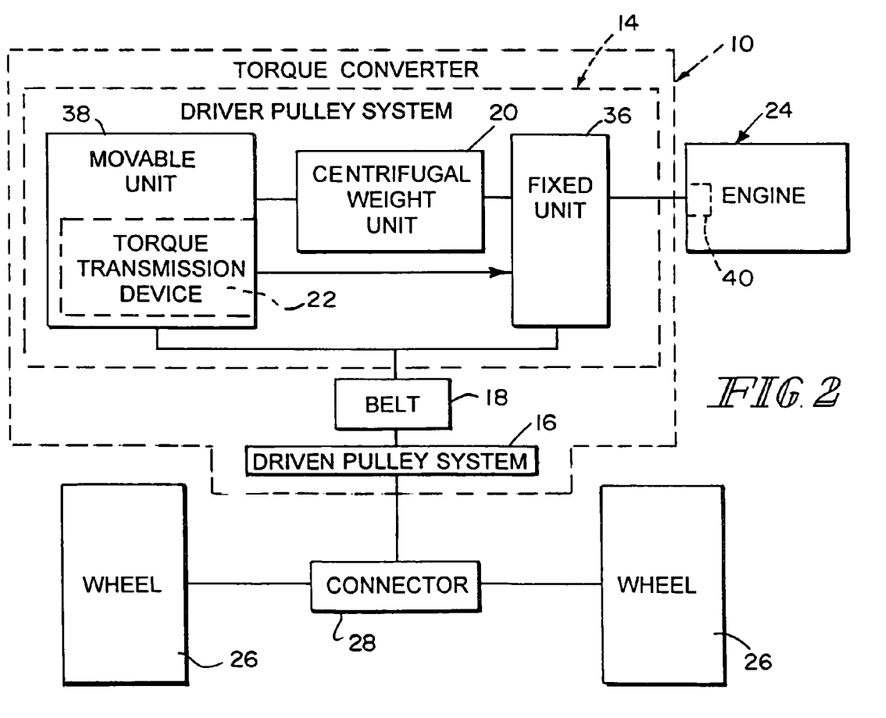
FIG. 2 is a diagrammatic view of the torque converter showing the driver pulley system including (1) a fixed unit configured to be fixed to an output of an engine for rotation with the engine output and (2) a movable unit that is configured to move relative to the fixed unit to facilitate shifting of the torque converter and that includes a torque transmission device configured to transmit torque to the fixed unit through a path not including a centrifugal weight unit of the driver pulley system upon application of torque to one or both of the rear wheels.
Figure 3:
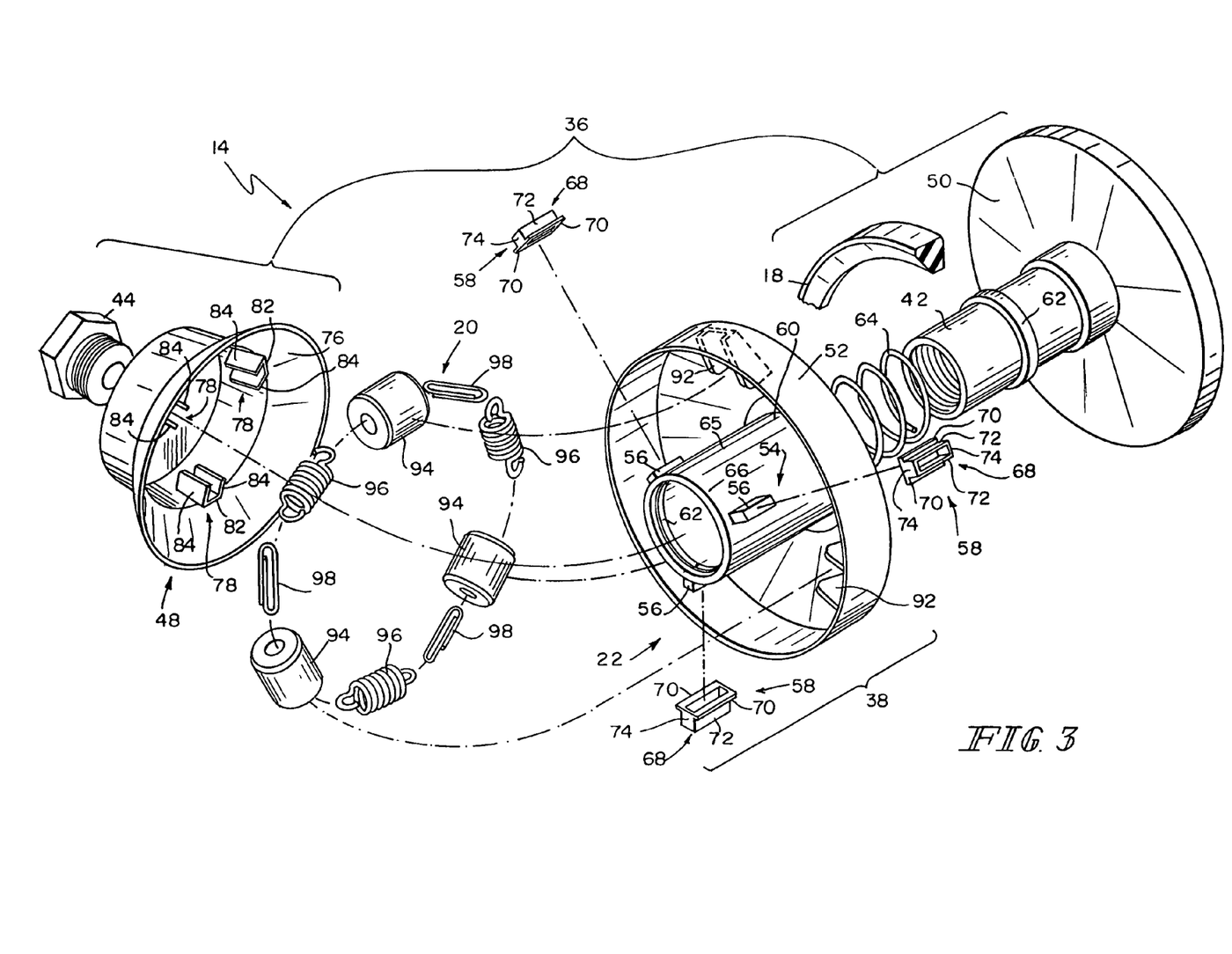
FIG. 3 is an exploded perspective view of the driver pulley system showing components of the movable unit and components of the centrifugal weight unit positioned between components of the fixed unit.

Driver pulley system 14 includes a fixed unit 36 and a movable unit 38, as shown, for example, in FIGS. 2 and 3. Fixed unit 36 is adapted to be fixed to a rotatable engine output 40 for rotation therewith. Engine output 40 is, for example, a drive shaft of engine 24, as shown, for example, in FIGS. 5, 8, and 10. Movable unit 38 is configured for axial movement relative to fixed unit 36 along an axis 39 to facilitate shifting of the drive ratio of torque converter 10.

In the illustrated embodiment, fixed unit 36 includes a fixed sleeve 42, a drive nut 44, a fastener 46, a cover 48, and an annular fixed flange 50, as shown, for example, in FIGS. 3, 5, 8, and 10. Fixed sleeve 42 is adapted to receive and be keyed to engine output 40. Drive nut 44 is coupled to engine output 40 by fastener 46. Cover 48 is coupled to drive nut 44 by, for example, welding. Together, sleeve 42, drive nut 44, and fastener provide a hub of fixed unit 36. Fixed flange 50 is coupled to sleeve 42 by, for example, welding and extends radially outwardly therefrom.

In the illustrated embodiment, movable unit 38 includes an annular movable flange 52 and torque transmission device 22, as shown, for example, in FIGS. 3, 5, 8, and 10. Movable flange 52 and fixed flange 50 cooperate to receive belt 18 therebetween for engagement therewith. Centrifugal weight unit 20 is positioned between movable flange 52 and cover 48 and radially outwardly from torque transmission device 22.

In the illustrated embodiment, torque transmission device 22 includes a movable sleeve 54, three slider mounts 56, and a slider 58 coupled to each slider mount 56, as shown, for example, in FIGS. 3, 4, 5, 8, and 10. Movable flange 52 is coupled to a first end portion 60 of movable sleeve 54 by, for example, welding. Movable sleeve 54 is mounted on a pair of bearings 62 positioned between movable sleeve 54 and fixed sleeve 42 to allow axial movement of movable flange 52 relative to fixed flange 50. A spring 64 is positioned between bearings 62 to move movable sleeve 54 and, thus, movable flange 42 away from fixed flange 50.

Slider mounts 56 are coupled to an outer surface 65 of movable sleeve 54 at a second end portion 66 of movable sleeve 54, as shown, for example, in FIGS. 3, 5, 8, and 10. Slider mounts 56 are positioned about 120° apart from one another and are configured as axially elongated blocks.

Figure 4:
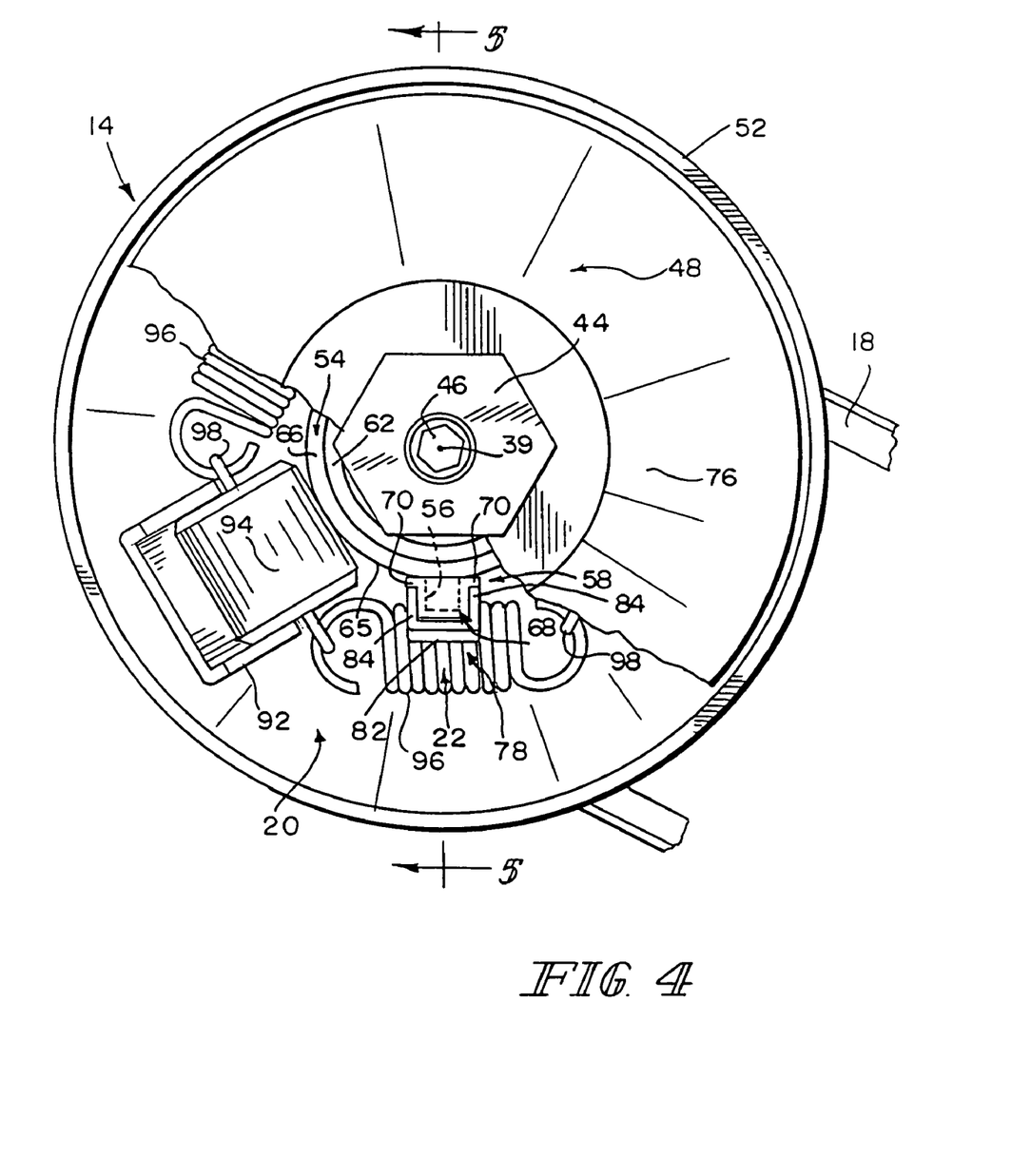
FIG. 4 is a front elevation view of the driver pulley system, with portions broken away, showing components of the torque transmission device including a somewhat T-shaped slider positioned for slidable movement against a somewhat U-shaped drive plate of the fixed unit.
Figures 5, 6:
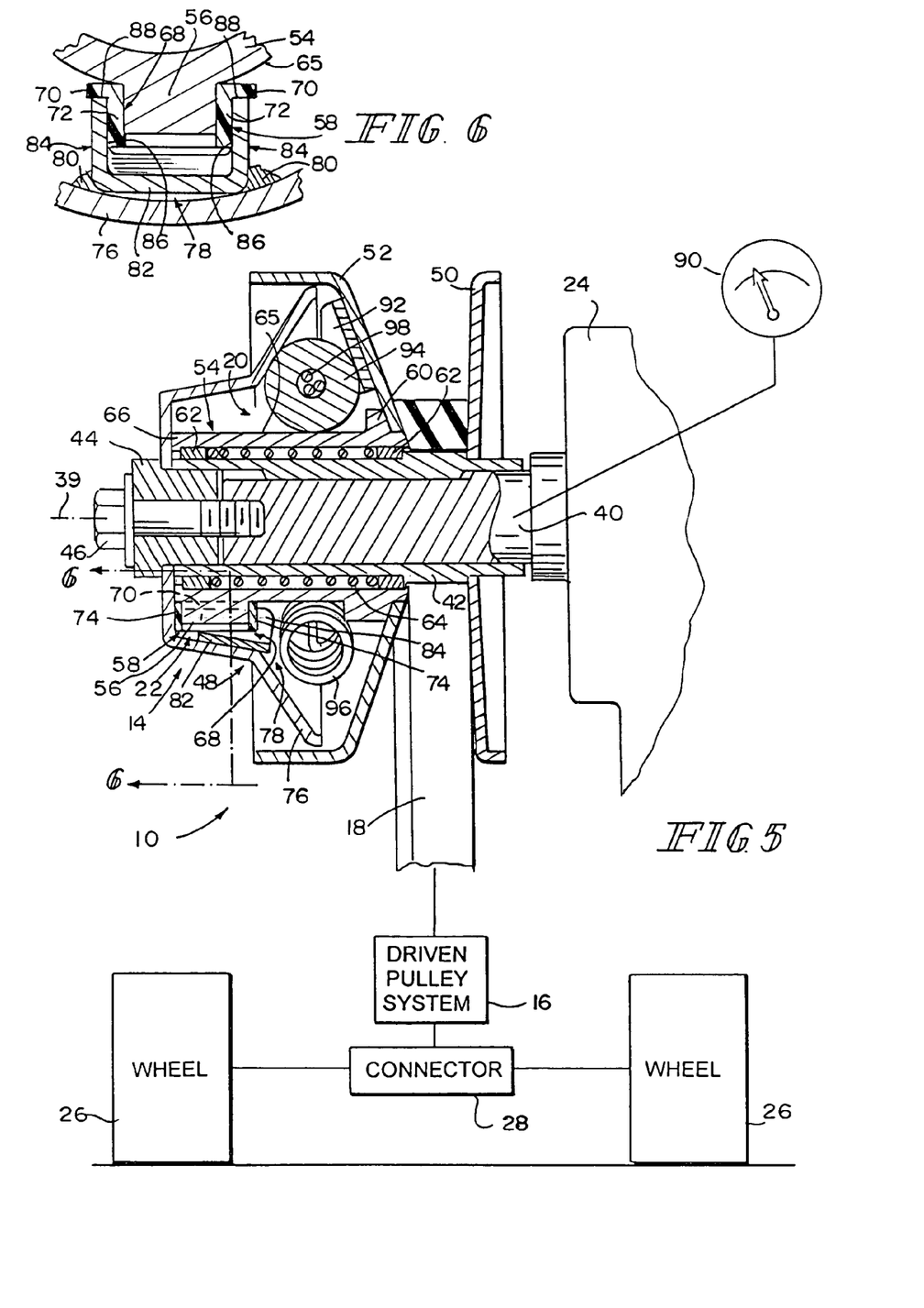
FIG. 5 is a sectional view taken along lines 5—5 of FIG. 4 showing the driver pulley system at rest in which the belt is positioned at its radially innermost position to position a movable flange of the movable unit away from a fixed flange of the fixed unit.
FIG. 6 is a sectional view taken along lines 6—6 of FIG. 5 showing the torque transmission device including a slider mount coupled to an outer surface of a sleeve and a slider coupled to the slider mount and engaging a drive plate included in a cover of the fixed unit.

Each slider 58 includes a collar 68 and a pair of slider tabs 70, as shown, for example, in FIGS. 3, 4, and 6. Collar 68 is axially elongated so as to fit on one of slider mounts 56. Collar 66 includes a pair of parallel, axially elongated side walls 72 and a pair of parallel end walls 74 coupled to and extending between side walls 72. Each slider tab 70 is cantilevered to a side wall 72 so as to extend laterally outwardly therefrom. Collar 68 and slider tabs 70 cooperate so that slider 58 has an end profile that is T-shaped, as shown, for example, in FIG. 4.

Cover 48 includes a base plate 76 and a drive plate 78 associated with each slider 58 to rotate movable unit 38, as shown, for example, in FIG. 3. Base plate 76 is coupled to drive nut 44 by, for example, welding. Each drive plate 78 is coupled to base plate 76 by, for example, weldments 80 shown, for example, in FIG. 6. Drive plate 78 is U-shaped in cross-section and includes a drive plate tab mount 82 coupled to base plate 76 by weldments 80 and a pair of parallel, axially elongated drive plate tabs 84 extending radially from drive plate tab mount 82 to receive a collar 68 therebetween.

Each slider 58 is configured to slide against one of drive plates 78 upon axial movement of movable unit 38 relative to fixed unit 36. Each slider side wall 72 is configured to slide against an inner surface 86 of a drive plate tab 84. Engagement between side walls 72 and drive plate tabs 84 promote transmission of a drive force generated by engine 24 from fixed unit 36 to movable unit 38 and promote transmission of torque from movable unit 38 to fixed unit 36 as discussed in more detail herein. An edge 88 of each drive plate tab 84 engages a slider tab 70 to block radially outward movement of slider 58.

Sliders 58 are made of a relatively low friction material to facilitate slidable movement against drive plates 78. In the illustrated embodiment, sliders 58 are made of an acetal resin such as DELRIN®. In some embodiments, sliders 58 are made of materials such as polyethylene, powdered metal, or brass. A suitable coefficient of friction for the material of sliders 58 is about 0.18.

Components of driver pulley system 14 assume an at-rest/idle position shown, for example, in FIG. 5 when engine 24 is at rest or idling as indicated by a tachometer 90. In the at-rest/idle position, movable flange 52 is positioned at its farthest point away from fixed flange 50 to allow belt 18 to assume its radially innermost position on driver pulley system 14.

Figure 7:
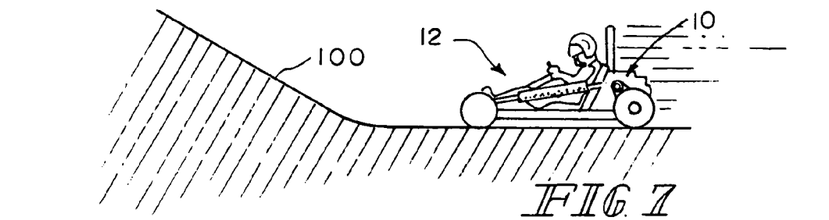
FIG. 7 is an elevation view showing the vehicle traveling on a level surface.
Figure 8:
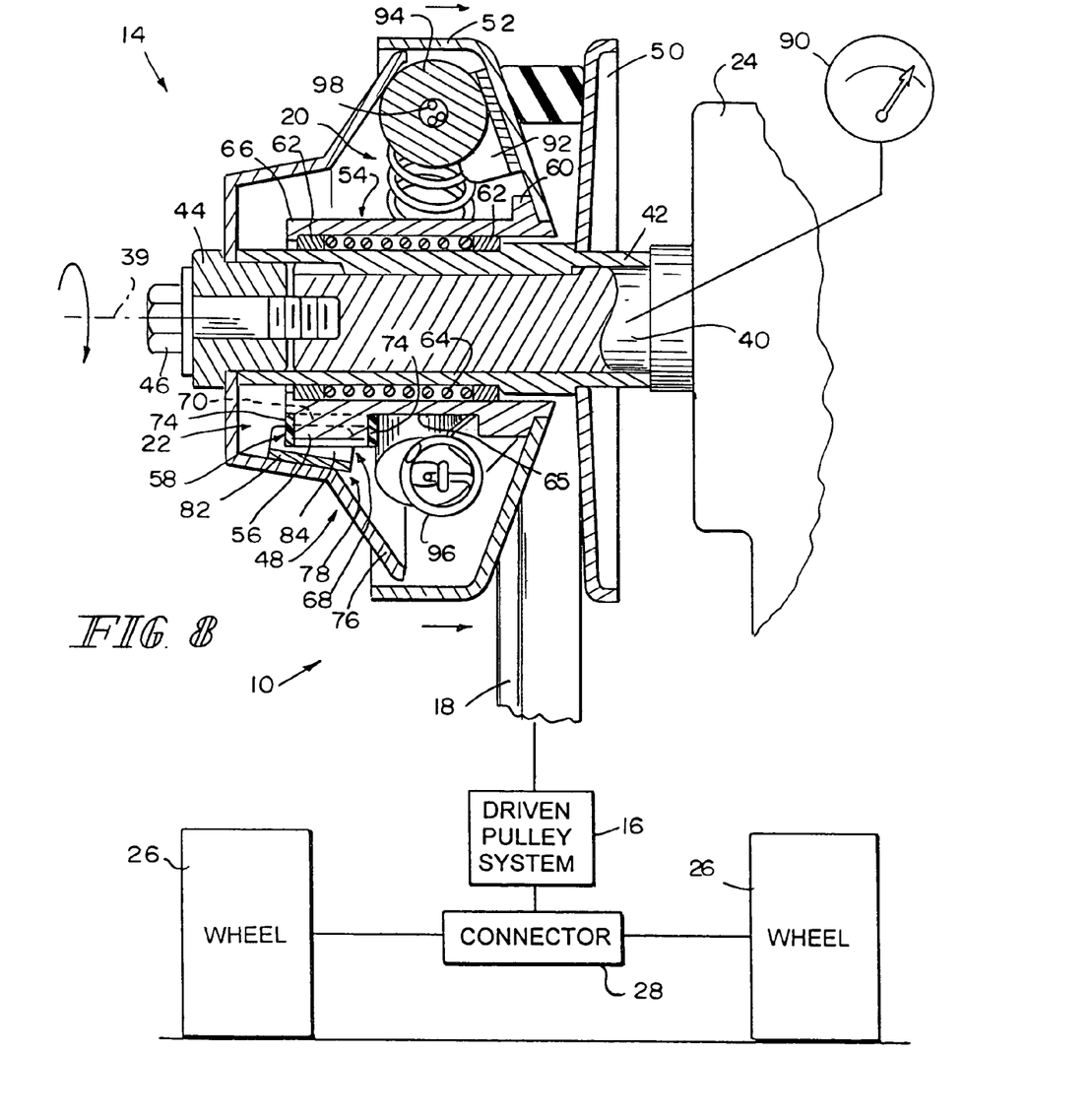
FIG. 8 is a sectional view of the driver pulley system corresponding to the situation shown in FIG. 7 in which the centrifugal weight unit has moved radially outwardly to cause the movable flange to move axially toward the fixed flange and the belt to move radially outwardly to upshift the torque converter due to an increase in engine speed.

When engine speed increases, as suggested, for example, in FIGS. 7 and 8, components of driver pulley system 14 assume an operational position shown, for example, in FIG. 8. Drive plates 78 rotate movable unit 38 through engagement between drive plate tabs 84 and side walls 72 of collars 68. Such rotation is transmitted to centrifugal weight unit 20 through weight guides 92 which are coupled to movable flange 52 and engage components of unit 20. In some embodiments, weight guides 92 are coupled to base plate 76 instead of movable flange 52.

Centrifugal weight unit 20 moves radially outwardly due to centrifugal force thereon upon increased engine speed and moves radially inwardly upon a decrease in engine speed. In the illustrated embodiment, unit 20 includes three weights 94, three springs 96, and three spring connectors 98. Each spring connector 98 extends through a weight 94 to interconnect adjacent springs 96. The springs and connectors comprise means biasing the weights toward axis 39.

Weights 94 move radially outwardly and follow weight guides 92 when the centrifugal force on weights 94 overcomes a resistive force from springs 96. Radially outward movement of weights 94 causes axial movement of movable flange 52 toward fixed flange 50. Movable flange 52 engages belt 18 to cause belt 18 to move radially outward to upshift torque converter 10. As movable flange 52 moves axially toward fixed flange 50, sliders 58 slide axially against drive plates 78.

Figure 9:
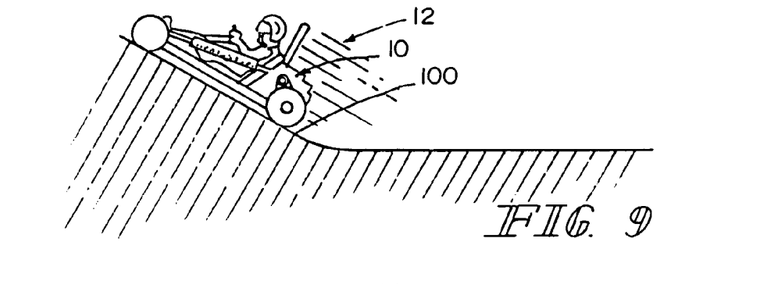
FIG. 9 is an elevation view showing the vehicle traveling up a hill.

Torque experienced by one or both wheels 26 causes torque converter 10 to downshift to maintain engine speed at about the level it was before vehicle 12 began traveling up hill 100. Such torque may result from driving vehicle 12 up a hill 100 or other incline, as shown, for example, in FIG. 9.

As wheels 26 experience torque, driven pulley system 16 pulls belt 18 radially inwardly and applies torque to belt 18. Radially inward movement of belt 18 causes movable flange 52 to move axially away from fixed flange 50, as shown, for example, in FIG. 10. Such axial movement of movable flange 52 causes centrifugal weight unit 20 to move radially inwardly and causes sliders 58 to slide against drive plates 78.

Figure 10:
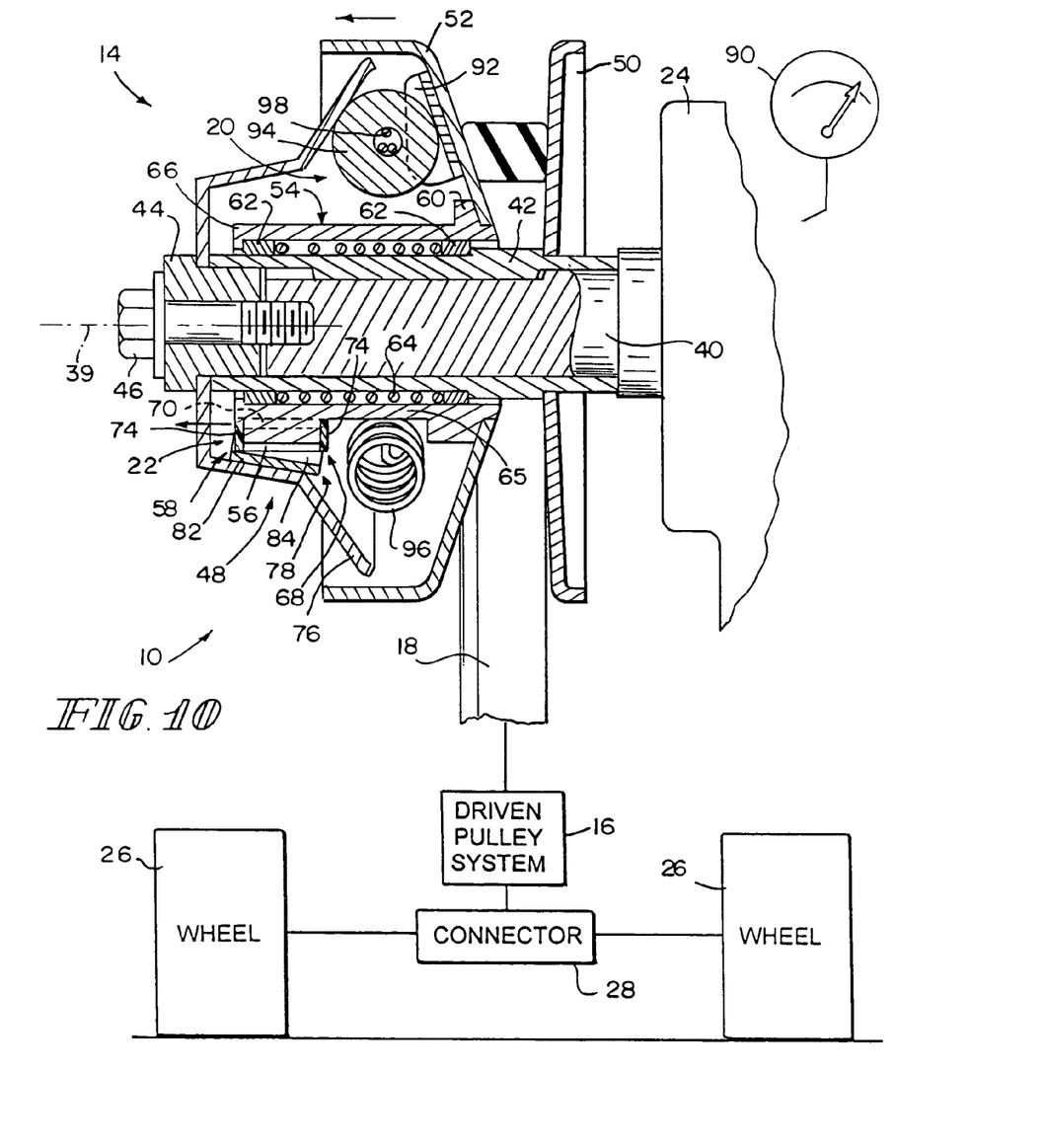
FIG. 10 is a sectional view of the driver pulley system corresponding to the situation shown in FIG. 9 in which torque applied to one or both of the wheels due to travel up the hill results in downshifting of the torque converter and application of torque to the movable flange by the belt for transmission to the cover through components of the torque transmission device but not through the centrifugal weight unit to limit loading on the centrifugal weight unit.

Torque applied to belt 18 is transmitted to movable flange 52 through engagement between belt 18 and movable flange 52. Torque transmission device 22 then transmits the torque from movable flange 52 to drive plates 78 for eventual transmission to drive shaft 40, thereby counteracting a tendency of engine speed to increase upon radially inward movement of weight unit 20.

Device 22 transmits torque from movable flange 52 to cover 48 through a path not including weight unit 20 to limit loading thereon. Torque is transmitted from movable flange 52 in series through movable sleeve 54, slider mounts 56, and sliders 58 to drive plates 78. Side walls 72 of sliders 58 transmit torque to drive plate tabs 84 of drive plates 78. Device 22 thus provides means for transmitting torque from movable flange 52 to cover 48 through a path not including centrifugal weight unit 20 for transmission of torque to engine output 40 upon application of torque to movable flange 52 by the belt 18.

Driver pulley system 14 moves to its at-rest/idle position when engine 24 is turned off or engine 24 resumes idle. Spring 64 moves torque transmission device 22 and movable flange 52 away from fixed flange 50 and springs 96 move weights 94 radially inwardly. Driven pulley system 16 pulls belt 18 back to its radially innermost position.

The invention claimed is:

1. A driver pulley system for use in a torque converter, the driver pulley system comprising
    a fixed unit adapted to be fixed to a rotatable engine output for rotation therewith about an axis, the fixed unit including a fixed flange and a cover,
    a centrifugal weight unit comprising a plurality of weights and a first biasing means for biasing the weights toward the axis, and
    a movable unit configured to move relative to the fixed unit, the movable unit including a movable flange configured to cooperate with the fixed flange to receive a belt of the torque converter therebetween, a second biasing means for biasing the movable flange away from the fixed flange, the centrifugal weight unit being positioned between the movable flange and the cover and configured to move the movable flange toward the fixed flange in response to centrifugal force, the cover axially covering the centrifugal weight unit, the movable unit including a torque transmission device configured to transmit torque from the movable flange to the cover upon application of torque to the movable flange by the belt.

2. The driver pulley system of claim 1, wherein the cover includes a drive plate configured to rotate the movable unit and the torque transmission device includes a movable sleeve coupled to the movable flange, a slider mount coupled to an outer surface of the movable sleeve, and a slider coupled to the slider mount for axial, slidable movement against the drive plate.

3. The driver pulley system of claim 2, wherein the slider mount includes an axially elongated block coupled to the outer surface of the movable sleeve and the slider includes an axially elongated collar fitted on the block and engaging spaced-apart first and second drive plate tabs included in the drive plate, an axially elongated first slider tab cantilevered to the collar and engaging an edge of the first drive plate tab, and an axially elongated second slider tab cantilevered to the collar and engaging an edge of the second drive plate tab.

4. The driver pulley system of claim 1, wherein the cover includes a base plate and three drive plates coupled to the base plate and spaced about 120° apart from one another to rotate the fixed unit, the torque transmission device includes a movable sleeve coupled to the movable flange, three slider mounts coupled to the movable sleeve and spaced about 120° apart from one another, and three sliders, and each slider is coupled to one of the slider mounts and configured for axial, slidable movement against one of the drive plates.

5. A driver pulley system for use in a torque converter, the driver pulley system comprising
    a fixed unit adapted to be fixed to a rotatable engine output for rotation therewith about an axis, the fixed unit including a fixed flange and a cover,
    a centrifugal weight unit comprising a plurality of weights and springs with the springs biasing the weights toward the axis, and
    a movable unit configured to move relative to the fixed unit, the movable unit including a movable flange configured to cooperate with the fixed flange to receive a belt of the torque converter therebetween, the centrifugal weight unit being positioned between the movable flange and the cover and configured to move the movable flange toward the fixed flange in response to centrifugal force, the movable unit including a torque transmission device configured to transmit torque from the movable flange to the cover upon application of torque to the movable flange by the belt.

6. The driver pulley system of claim 5, wherein the cover includes a drive plate configured to rotate the movable unit and the torque transmission device includes a slider configured for axial, slidable movement against the drive plate.

7. The driver pulley system of claim 6, wherein the torque transmission device includes a movable sleeve coupled to the movable flange and a slider mount coupled to the movable sleeve and the slider is coupled to the slider mount.

8. The driver pulley system of claim 7, wherein the slider mount includes a block coupled to an outer surface of the movable sleeve and the slider includes a collar fitted on the block and engaging the drive plate.

9. The driver pulley system of claim 8, wherein the drive plate includes a drive plate tab mount and first and second drive plate tabs extending from the drive plate tab mount and cooperating with the drive plate tab mount so that the drive plate has a U-shaped cross-section, the collar is positioned between the first and second drive plate tabs and includes an axially elongated first side wall engaging the first drive plate tab, an axially elongated second side wall engaging the second drive plate tab, and a pair of end walls extending between the first and second side walls, and the slider includes an axially elongated first slider tab cantilevered to the first side wall and engaging an edge of the first drive plate tab and an axially elongated second slider tab cantilevered to the second side wall and engaging an edge of the second drive plate tab.

10. The driver pulley system of claim 6, wherein the slider includes a collar and a slider tab cantilevered to the collar, the collar is fitted on a block included in the torque transmission device and engages a drive plate tab included in the drive plate, and the slider tab engages an edge of the drive plate tab.

11. The driver pulley system of claim 6, wherein the slider includes a collar engaging the drive plate.

12. The driver pulley system of claim 6, wherein the drive plate engages the slider to block radially outward movement of the slider.

13. The driver pulley system of claim 6, wherein the slider is positioned radially inwardly from the drive plate.

14. The driver pulley system of claim 5, wherein the cover includes a base plate and three drive plates coupled to the base plate and spaced about 120° apart from one another to rotate the fixed unit, the torque transmission device includes three sliders spaced about 120° apart from one another, and each slider is configured for axial, slidable movement against one of the drive plates.

15. The driver pulley system of claim 5, wherein the torque transmission device is positioned radially inwardly from the centrifugal weight unit.

16. A driver pulley system for use in a torque converter, the driver pulley system comprising
 a fixed unit adapted to be fixed to a rotatable engine output for rotation therewith about an axis, the fixed unit including a fixed flange and a cover,
 a centrifugal weight unit comprising a plurality of weights and means for biasing the weights toward the axis, and
 a movable unit configured to move relative to the fixed unit, the movable unit including a movable flange configured to cooperate with the fixed flange to receive a belt of the torque converter therebetween, the centrifugal weight unit being positioned between the movable flange and the cover and configured to move the movable flange toward the fixed flange in response to centrifugal force, the cover axially covering the centrifugal weight unit, the movable unit including a torque transmission device including a slider configured for axial, slidable movement against the cover for transmission of torque from the movable flange to the cover through a path including the slider but not including the centrifugal weight unit upon application of torque to the movable flange by the belt and axial movement of the movable flange away from the fixed flange due to radially inward movement of the belt.

17. The driver pulley system of claim 16, wherein the cover includes a drive plate configured to rotate the movable unit, the movable unit includes a movable sleeve coupled to the movable flange and a, slider mount coupled to the movable sleeve, and the slider is coupled to the slider mount for axial, slidable movement against the drive plate for transmission of torque, in series, from the movable flange through the movable sleeve, the slider mount, and the slider to the drive plate.

18. The driver pulley system of claim 17, wherein the slider mount includes a block coupled to an outer surface of the movable sleeve, the slider includes a collar fitted on the block and a slider tab cantilevered to the collar, the collar engages a drive plate tab included in the drive plate to transmit torque to the drive plate tab, and an edge of the drive plate tab engages the slider tab to block radially outward movement of the slider.

19. The driver pulley system of claim 17, wherein the movable sleeve includes first and second end portions, the movable flange is coupled to the first end portion, and the slider mount is coupled to the second end portion.

20. The driver pulley system of claim 16, wherein the slider includes acetal.

21. A driver pulley system for use in a torque converter, the driver pulley system composing
 first and second flanges adapted to receive a belt of the torque converter therebetween and to move the first flange axially relative to the second flange,
 a centrifugal weight unit being configured to move the first flange axially relative to the second flange in response to centrifugal force,
 a cover axially covering the centrifugal weight unit, the cover including U-shaped drive plate configured for rotation of the first flange, and
 a torque transmission device including a sleeve coupled to the first flange for axial movement therewith, a slider mount coupled to the sleeve, and a T-shaped slider coupled to the slider mount and received by the drive plate for axial, slidable movement against the drive plate, the torque transmission device being configured to transmit torque from the first flange to the drive plate through a path including the sleeve, the slider mount, and the slider but not including the centrifugal weight unit upon application of torque to the first flange by the belt.

\* \* \* \* \*